(12) United States Patent
Webb et al.

(10) Patent No.: US 10,803,153 B2
(45) Date of Patent: Oct. 13, 2020

(54) SESSION BASED ELASTIC LAYERING

(71) Applicant: CITRIX SYSTEMS, INC., Fort Lauderdale, FL (US)

(72) Inventors: John Webb, Sutton, MA (US); Christopher W. Midgley, Marlborough, MA (US); Manuel Gonsalves, Westborough, MA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 190 days.

(21) Appl. No.: 15/785,871

(22) Filed: Oct. 17, 2017

(65) Prior Publication Data
US 2018/0114002 A1 Apr. 26, 2018

Related U.S. Application Data

(60) Provisional application No. 62/411,456, filed on Oct. 21, 2016.

(51) Int. Cl.
  *G06F 21/31* (2013.01)
  *G06F 21/62* (2013.01)
  *G06F 16/951* (2019.01)
  *G06F 9/445* (2018.01)

(52) U.S. Cl.
  CPC .......... *G06F 21/31* (2013.01); *G06F 9/44505* (2013.01); *G06F 9/44521* (2013.01); *G06F 16/951* (2019.01); *G06F 21/6218* (2013.01); *G06F 2221/2149* (2013.01)

(58) Field of Classification Search
  CPC .... G06F 21/31; G06F 16/951; G06F 9/44505; G06F 9/44521; G06F 21/6218; G06F 2221/2149
  See application file for complete search history.

(56) References Cited

U.S. PATENT DOCUMENTS

| 8,386,757 | B1 | 2/2013 | Midgley et al. |
| 8,543,797 | B1 | 9/2013 | Midgley et al. |
| 9,201,494 | B1 | 12/2015 | Midgley et al. |

(Continued)

OTHER PUBLICATIONS

Derek.Hennessy, "Unidesk—Layers: A New Simpler Approach to Managing Desktops", Jun. 2013, 5 pages (Year: 2013).*

(Continued)

*Primary Examiner* — Chau Le
*Assistant Examiner* — Han Yang
(74) *Attorney, Agent, or Firm* — Allen, Dyer, Doppelt + Gilchrist, PA

(57) ABSTRACT

A server includes a processor to execute a single generic composited layered image that includes an operating system layer and an application layer. A layering engine hooks into the user log-in process to capture a user identification of the user initiating the log-in process, and compares the user identification to a list of additional application layers that are to be available to different users based on their respective user identifications. The layering engine determines if at least one additional application layer is to be available to the user based on the compare, and creates a single user-specific composited layered image by mounting the at least one additional application layer to the single generic composited layered image if the at least one additional application layer is to be available to the user.

18 Claims, 3 Drawing Sheets

(56) References Cited

U.S. PATENT DOCUMENTS

| | | | | |
|---|---|---|---|---|
| 2003/0233490 | A1* | 12/2003 | Blaser | G06F 8/61 |
| | | | | 719/328 |
| 2008/0109365 | A1* | 5/2008 | Kulkarni | G06F 21/31 |
| | | | | 705/55 |
| 2011/0040812 | A1* | 2/2011 | Phillips | G06F 9/45541 |
| | | | | 707/822 |

OTHER PUBLICATIONS

Robert L. Mitchell, "Desktop virtualization at a glance: VDI", May 2011, 7 pages (Year: 2011).*

Brian Madden, "What is app virtualization? Part 3: Layering", Mar. 2016, 9 pages (Year: 2016).*

Alexander Ervik Johnsen, "Unidesk announces elastic layering and session container for Citrix XenApp", Jan. 2016, 5 pages (Year: 2016).*

* cited by examiner

SESSION BASED ELASTIC LAYERING

RELATED APPLICATIONS

This application claims the benefit of provisional application Ser. No. 62/411,456 filed Oct. 21, 2016, which is hereby incorporated herein in its entirety by reference.

TECHNICAL FIELD

The present disclosure relates to the field of computing devices, and more particularly, to delivering applications to users of terminal services.

BACKGROUND

One well known method of delivering Windows desktops and applications is called session host or terminal services. Although it is a cost effective way to deliver computing resources, the fact that multiple users share a single instantiation of the Windows operating system means that the ability to provide each user with unique applications is limited.

With session hosting, a server delivers desktops to clients. Using a Microsoft Windows paradigm, a host computer system runs Microsoft Windows with terminal services (also called Remote Desktop Services (RDS)) enabled. Users connect on client computing devices, which are network connected to the host.

Each client device operates Windows or a Windows terminal, and when users log in they choose to log in to terminal services/RDS. The log in verifies their account at the host, which launches a virtual machine for that user and delivers a desktop for display on the client computing device. Once logged in, the client device essentially serves as a dumb terminal, with all storage, processing, and other computing operations performed by the host system. The host streams a user interface to the client for display, and all user input at the client is transmitted back to the host for software execution. Multiple users can connect to the same host simultaneously, and have access to the same applications as installed on the host.

In application layering, it is common to present a virtualized view of the file system and registry. In that scheme the layering software intercept various I/O requests to the various underlying file systems (such as on Windows, the NTFS file system and Windows registry) and returns modified data so that applications and end users experience unified file systems that merge or composite the data that come from multiple sources (or layers). For example, if a user or an application were to query the contents of a folder on the file system, the layering software could present a list containing three folders from the underlying base operating system. Two folders may be from one application layer, and another folder may be from a second application layer, all presented as a single file system in a single directory.

U.S. Pat. Nos. 8,386,757, 8,543,797, and 9,201,494 provide details on known systems and methods for application layering, and are hereby fully incorporated by reference in their entirety and are assigned to the current assignee of the present disclosure. In these prior solutions, layering, or composition, software operates to intercept all file access requests and direct them to a file system made up of merged or composited layers. A layer manager system (ELM), or cache appliance, stores and manages layers, and delivers the layers a user has access to in advance or in real-time to the layering software. The layer manager system (ELM) is also known as a layering engine. This layering process extends completely to the boot disk used to launch a computer operating system, enabling customizable and individual desktops for individual users.

Application layering enables delivering personalized desktops for individual users, while simplifying application management and consolidating storage by in effect creating a customizable (virtual) machine for each user. Terminal services can similarly consolidate storage and centralize application management across multiple users, but does not enable the personalized desktop or application capabilities of application layering as all terminal services users are logging in to the same machine delivering desktops and applications installed on that machine.

Applying existing application layering solutions to interoperate with terminal services solutions does not provide significant advantages—the host system may be layered or composited, but all terminal service users have the same experience as if application layering were not used. However, many existing environments and applications have been deployed specifically for terminal services, and replacing with application layering can be logistically challenging for IT departments, particularly when considering scales of thousands of users.

What is needed, therefore, is a solution which makes personalizable desktops and individualized applications possible through application layering in terminal services environments.

SUMMARY

Elastic layering enables a way, within systems operating terminal services or session hosts, to present unique data experiences for each user enabling per-user applications and data to be provided on a shared computer. This also enables applications to be managed once, independent of the computer executing the applications, and delivered to those computers on-demand without a reboot or restart, thus enabling non-disruptive application updates and changes.

When a user logs in to a layered terminal server, a user identification is tracked along with identification of the terminal server (session identification). Those two identifications are tracked by layering software to mount layers specific to each user session, and composite and present a unified namespace for each user. Hooks into the log-in process are used to start any needed services or applications, or execute layer-specific scripts that need to be running. In this fashion, each user of a terminal server may see different files and applications, and have a user-customized desktop, beyond the capabilities of a normal terminal server.

With elastic layering, many users can share one Windows server, but still experience a custom set of applications and data. The high density of users to operating system instances allows for a cost-effective use of the hardware, and with this invention the end users can experience a set of applications (shared and personally installed) and personal data and settings, that are unique to them.

More particularly, a server includes at least one processor configured to execute a single generic composited layered image comprising an operating system layer and at least one application layer, with the operating system layer providing a user interface to be accessed by anyone of a plurality of different users via a user log-in process. A layering engine, in response to each user log-in process, may hook into the user log-in process to capture a user identification of the user initiating the log-in process, and compare the user identification to a list of additional application layers that are to be available to the plurality of different users based on their respective user identifications. The layering engine may then determine if at least one additional application layer is to be available to the user based on the compare, and create a single user-specific composited layered image by mounting the at least one additional application layer to the single generic composited layered image if the at least one additional application layer is to be available to the user.

The layering engine may be further configured to save the single user-specific composited layered image. The layering engine may also capture a host session identification based on the user logging-in so that a next time the user logs-in the single user-specific composited layered image is available.

The layering engine may be further configured to access a policy database prior to the compare. The policy database may include the list of additional application layers that are to be available to the plurality of different users based on their respective user identifications. The policy database may be remotely located from the server.

The server may have a host server identification associated therewith. The policy database may further include a list of host server identifications, with each host server identification identifying the list of additional application layers that are available to that host server. The layering engine may further access the policy database based on the host server identification.

Another aspect is directed to a method for operating a server as described above. The method may include executing a single generic composited layered image comprising an operating system layer and at least one application layer, with the operating system layer providing a user interface to be accessed by anyone of a plurality of different users via a user log-in process. The method may include hooking into a user log-in process to capture a user identification of the user initiating the log-in process, and comparing the user identification to a list of additional application layers that are to be available to the plurality of different users based on their respective user identifications. The method may further include determining if at least one additional application layer is to be available to the user based on the comparing, and creating a single user-specific composited layered image by mounting the at least one additional application layer to the single generic composited layered image if the at least one additional application layer is to be available to the user.

Yet another aspect is directed to a non-transitory computer readable medium for a server as described above, with the non-transitory computer readable medium having a plurality of computer executable instructions for causing the server to perform steps comprising executing a single generic composited layered image comprising an operating system layer and at least one application layer, with the operating system layer providing a user interface to be accessed by anyone of a plurality of different users via a user log-in process. The steps further include hooking into a user log-in process to capture a user identification of the user initiating the log-in process, and comparing the user identification to a list of additional application layers that are to be available to the plurality of different users based on their respective user identifications. The steps may further include determining if at least one additional application layer is to be available to the user based on the comparing, and creating a single user-specific composited layered image by mounting the at least one additional application layer to the single generic composited layered image if the at least one additional application layer is to be available to the user.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION

In the following detailed description, reference is made to the accompanying drawings which form a part hereof, and in which are shown, by way of illustration, specific embodiments which may be practiced. It is to be understood that other embodiments may be used, and structural changes may be made without departing from the scope of this disclosure.

The terminology and definitions of the prior art are not necessarily consistent with the terminology and definitions of the current disclosure. Where there is a conflict, the following definitions apply.

Application layer means a container with all of the file system and registry objects that make up that application. An application layer can contain multiple applications.

Layered image means a single disk that has been composited with multiple application layers. A layered image contains the minimum amount of information needed for an operating system to boot, and while it may contain many other applications delivered via composited layers, it is also possible for additional layers to be attached at a time once the OS layer is booting or booted.

Layered machine means a computer operating after booting from a layered image.

Figure 1:
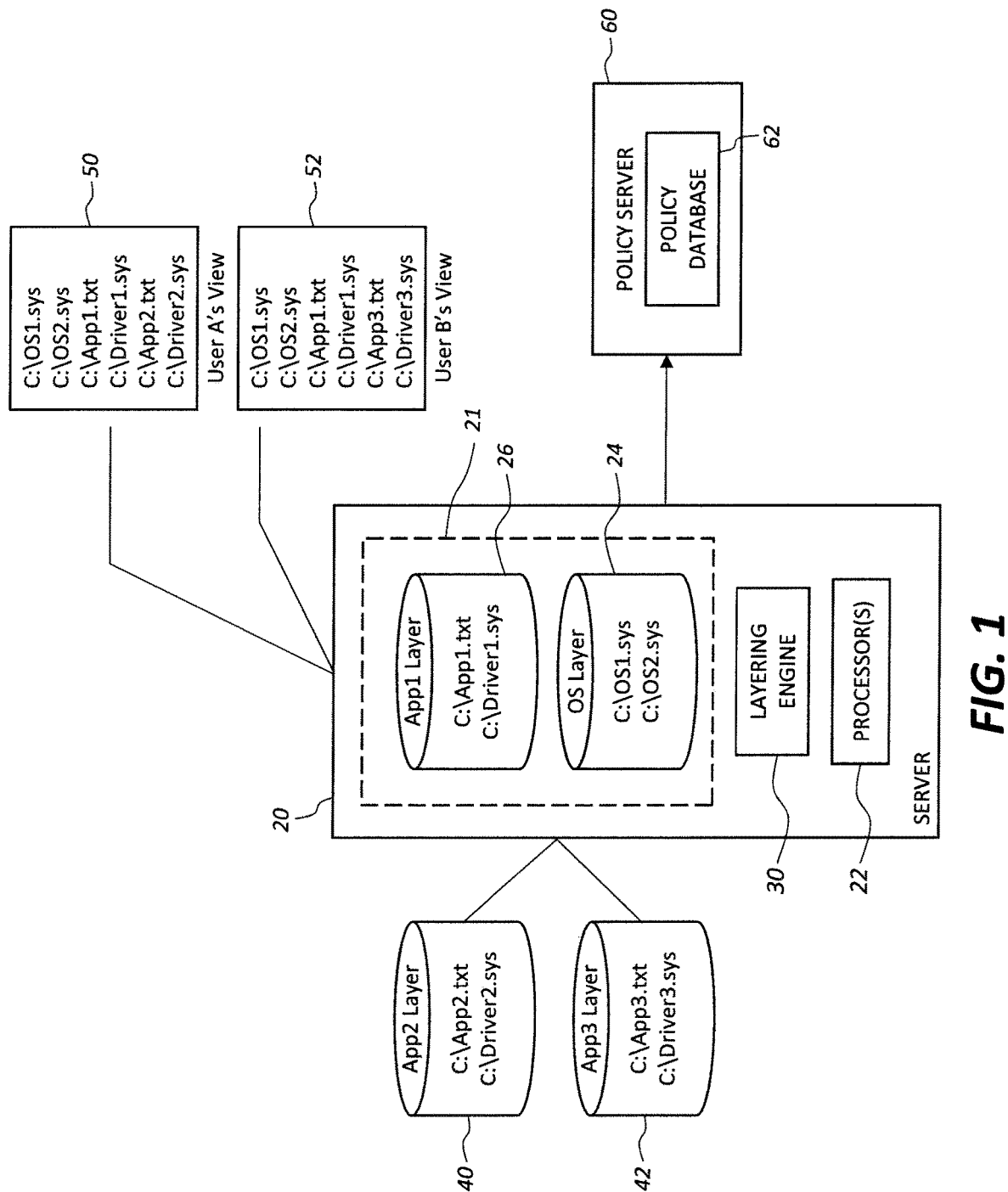
FIG. 1 is a block diagram of a single server illustrating content coming from four layers (connected in various ways) and the unique views that two users simultaneously connected to the machine have: User A has access to the OS, App1, and App2 layers, and User B has access to the OS, App1, and App3 layers.

Referring initially to FIG. 1, the illustrated server 20 includes at least one processor 22 configured to execute a single generic composited layered image comprising an operating system layer 24 and at least one application layer 26, with the operating system layer 24 providing a user interface to be accessed by anyone of a plurality of different users (e.g., User A, User B) via a user log-in process. A layering engine 30, in response to each user log-in process, hooks into the user log-in process to capture a user identification of the user initiating the log-in process, and compares the user identification to a list of additional application layers 40, 42 that are to be available to the different users based on their respective user identifications. The layering engine 30 then determines if additional application layers 40, 42 are to be available to the user based on the compare, and creates a single user-specific composited layered image 50, 52 by mounting the additional application layers 40, 42 to the single generic composited layered image if the additional application layers are to be available to the user.

In the example, User A has app2 layer 40 mounted to the single generic composited layered image which includes the OS layer 24 and the app1 layer 26. User B has app3 layer 42 mounted to the single generic composited layered image which includes the OS layer 24 and the app1 layer 26.

The layering engine 30 is further configured to save the single user-specific composited layered image 50, 52. The layering engine 30 captures a host session identification based on the user logging-in so that a next time the user logs-in the single user-specific composited layered image 50, 52 is available.

The layering engine 30 is further configured to access a policy database 62 prior to the compare. The policy database 62 includes the list of additional application layers 40, 42 that are to be available to the different users based on their respective user identifications. The policy database 62 may be remotely located from the server 20 in a policy server 60. Alternatively, the policy database 62 may reside within the server 20.

The server 20 has a host server identification associated therewith. The policy database 62 further include a list of host server identifications, with each host server identification identifying the list of additional application layers 40, 42 that are available to that host server. The layering engine 30 further accesses the policy database 62 based on the host server identification.

Elastic layering extends application layering to terminal services (RDS) or remote hosts (referred to as terminal services) to provide individual desktops and applications to different users of the same host. Applying the prior application layering solutions to terminal servers enables a layered terminal server, but not uniquely layered desktops for each user of that terminal server.

Elastic layering extends application layering by adding a session ID (which may be a unique identifier of the host server) and a user ID. In terminal services, the host system is launched and kept continuously running for remote users to access. The host may be operated as a layered machine as in prior layering solutions, with the layering software identifying a specific machine (the host session ID) to determine which layers are composited. The layering engine 30 provides an initial layered image boot disk for the terminal server and ensures any other layers needed are available to be mounted by the terminal server.

Layers may be stored on accessible storage locations, network addressable by both the layering engine 30 and the host system 20. Layers are mounted or otherwise accessible by the host, and layering software running on the host as kernel drivers intercepts all file and registry access requests, determines and directs them to the appropriately mounted layers, and determines the result to return to present a virtualized namespace merged from all mounted layers.

When a user logs into the host, a virtual operating system (guest OS) is launched by the host server 20 for that user session. All operations of the guest OS (file access, registry access, etc.) are handled by the layering software operating on the host server 20. Including the specific user ID in these operations enables different layers (applications, file systems, etc.) to be available to different users of the same host server 20. Thus, the files and/or applications for that specific user session may be dynamically composited based on session ID and user ID. Two different users of the same terminal server host may see different applications and/or files even during simultaneous operation.

With elastic layering, additional application layering software running as a service or daemon runs on the terminal server 20 tracking mounted layers and which users have access to those layers. This information may be stored in a predefined location, such as the system registry or a specific file. Additional software hooks into the login process for each guest user, capturing the user and session ID for each guest session, and triggering a callback to the service with the captured IDs.

With the identification of a user, and the host server identification, the service checks to see if appropriate layers have been mounted for the user. This is done through policy verification. Policy rules may be delivered as files to the host server 20, or stored and accessed, over the network, in a policy database 62. The policies may specify which application layers, and revisions of those application layers, to serve for that specific user session.

Policies can be set by administrators interacting with a policy server 60 through a user interface, to configure specific user or group rights and access to specific application layers. Alternatively, a separate policy server can be used to manage policies, which may be stored in files or databases. Stored policies can be accessed directly or through API interactions with the policy server.

The policies may be stored in a tabular format specifying associations between individual user id or group id and identification of specific application layers and revisions. Further information, such as time of day or geographical location may also be stored and associated in the policy rules, enhancing control over the layer access.

Additionally, policy rules can be set to make specific layers accessible to specific machines, which can be desirable for performance reasons even before a specific layer is otherwise needed. These policy rules can also be used for data that is hard to virtualize in real-time. For example, if there was a database file at the same filesystem path on multiple layers, the databases may be merged in advance so that any access to that file path receives the merged content instead of the highest priority layer's copy of that file.

Given a machine and user ID of a session, the policy server 60 may provide a map or list of application layers, including any particular versions or revisions, based on policy rules set by administrators and stored in the policy database. Some application layers may be attached to any session originating from a particular machine, some layers may always be attached to any machine that a particular user ID is accessing, or some combination or the two IDs can be used (i.e., layer X only attaches when the user logs onto this specific machine).

Other policy rules, such as time of day or geographical location of the session, can be set and used to further define specific layers and layer revisions that should be associated with a particular session. Users may also be enabled to set further policies within their administrator allowed policies, such as specifying specific layers for specific machines from within the set of all layers accessible to the user.

After the service on the host determines has identified which layers are accessible to the user for the current session, the service may verify if any of those layers have already been mounted by the host. Some or all of the layers may already be mounted to or accessible to the host due to previous access from other users with access to the same layer(s). Any layers not already accessible to the host OS may be mounted or otherwise connected to the host OS, and policy information stored in a registry or pre-determined file location identifying which layers are for the specific user session.

Since the contents of these additional application layers are added to the guest OS instance after the OS instance was launched, there are some additional steps to ensure that the contents of those layers functioning correctly before the user log-in process is allowed to finish. The layering software can start any applications present on the application layers that have been marked, either through a registry setting or files or metadata included with a layer, to be started. For example, an application may create a Windows service and register that service to auto-start. Since that application is being delivered to the machine after those OS processes have taken effect, the layering software can detect, such as via the registry, the existence of those services in any new layer being added to the system and request that the OS register and start those services. Similarly, specific drivers needed can be started at this point as well.

In addition, the contents of one or more of the layers may need additional steps run. Those steps can be hidden behind an API by being embedded in a script that is either in the same place in every layer, or referred to from a similar area. That script can cover cases such as application specific licensing needs, such as application contents that require a custom license registration program run whenever added to a new machine.

Once the application layers are accessible to software in the guest OS, the layering software retains an access token with the identity of the guest session, the user initiating the session, and a list of application layer revisions that they have access to. At this point the session log-in to the host can continue.

From that point forward, all calls (read/write requests) to the filesystem are intercepted as with normal application layering, and the file system intercepts also have access to the guest session id. By matching that session id with policy-based layer information stored in the registry or other pre-determined file location, the layering software drivers direct all file access to the appropriate layer(s) for the specific user session.

This accesses and presents a virtualized filesystem that only includes data from application layers from which that particular user session has access to. Likewise, any registry operations also look at the identity of the guest session originating the request and serve or write data to/from a virtualized registry that represents only the registry information from those application layer revisions.

Note that any modifications to the underlying filesystem or registries can be sent to a common writeable layer, or some number of guest sessions can have an optional writeable layer to which only modifications originating from that particular guest session will go. Policy dictating where writes from the machine or a specific guest session go can be located in the same policy databases that dictate what layers a machine or users receive.

As a result, the layering software uses the user identification to present to the specific users a virtualized view of the layers accessible to that user. For example, on a system with two simultaneous users, if each user (or application being run in the context of those users) performs a query of the same directory they can be shown different file system views.

If a first user has access to Application Layers A and B, and a second user has access to Application Layers B and C, then the first user may see three directories from the base Operating System, two folders from Application Layer A, and another folder from Application Layer B (and no content from Application Layer C). The second user may see two directories of those three directories from the base Operating System, the same folder from Application Layer B, and five folders from Application Layer C (and no content from Application Layer A).

Elastic layering further provides similar Session ID based isolation/compositing for other operating system capabilities, and creates a container of protection around each user. For example, operating services such as named pipes, networking sockets, inter-process communications, and application and device registries may have similar compositing and isolation presented, to enable some aspects of the operating system to be shared across sessions, while other services remain isolated to individual sessions.

Using this model, a single session can be protected from other sessions while enabling all applications and services within the session to operate without restriction or limitation. The policy rights, including right to create sockets/named pipes/etc., may be retrieved from the policy database by the layering software on user log-on.

In an alternate embodiment, elastic layering may be implemented based on process boundaries instead of user sessions. As each guest OS instance is launched within a separate process tree, a virtual namespace from multiple layers may be presented uniquely to each process tree. This alters the tracked identifiers from being user/session based, but may achieve the same results of unique user applications and files within the same terminal server.

In other alternate embodiment, elastic layering may extend to on-demand addition of layers after a user is logged in. For example, a shortcut object may be created in the filesystem that, when a user executes the shortcut, causes a specific layer to be attached at that point and then composited into the virtualized view of the file system and registry for that user. Such shortcuts may be managed by third party platforms, such as iTunes, allowing self-service application provisioning. The same actions taken during the log-in process for needed services/drivers/application execution can be run during execution of the shortcut.

Figure 2:
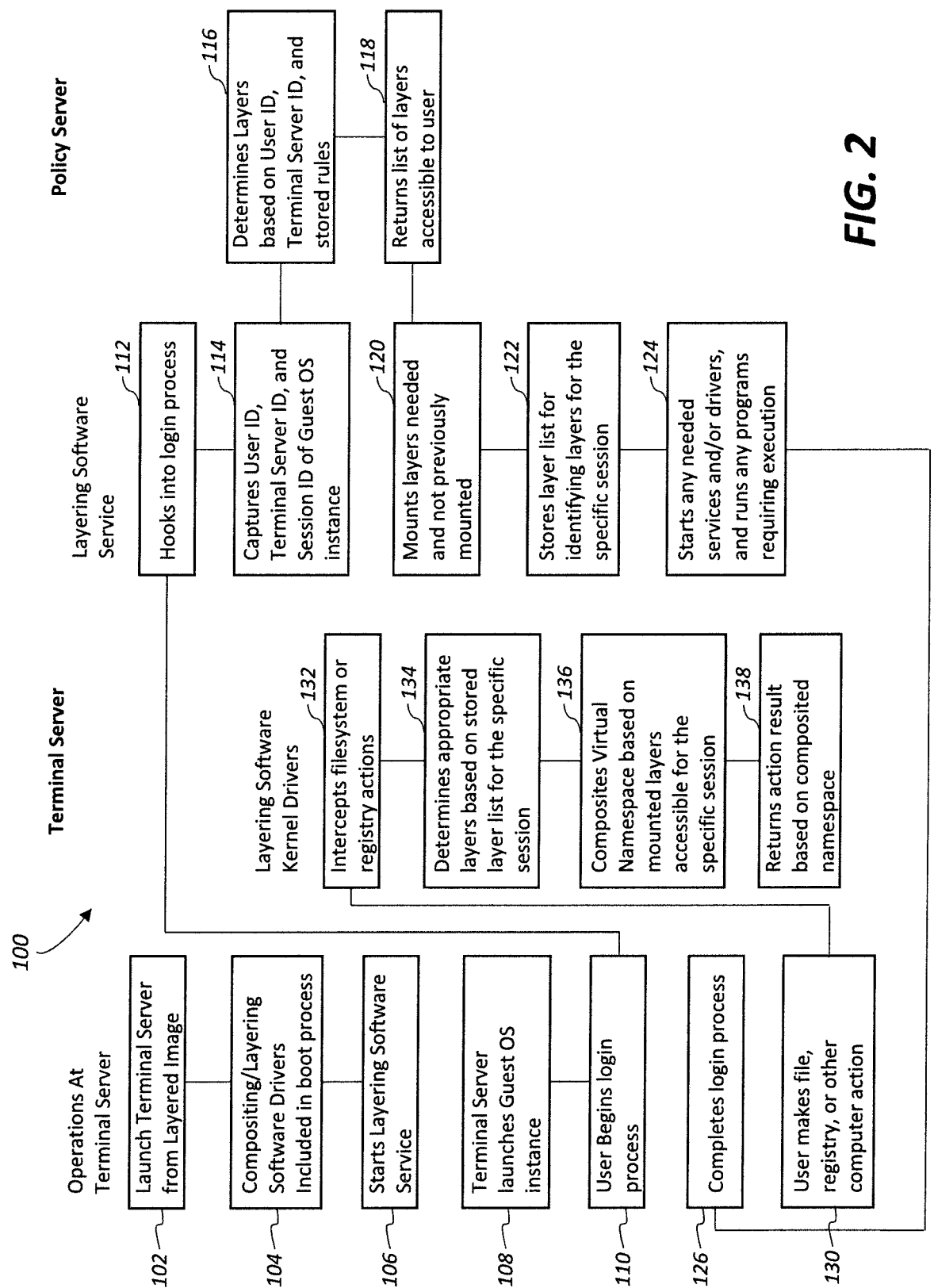
FIG. 2 is a flowchart showing process interactions between the server illustrated in FIG. 1, and the layering software running on the server.

Referring now to FIG. 2, a flowchart 100 showing process interactions between the server 20 and the layering software running on the server will be discussed. At Block 102, the terminal server 20 is launched from a layered image. During the boot process, the compositing and layering software drivers boot up at Block 104. As part of the boot up process, the layering service software starts at Block 106. The layering service software is now waiting for a user to log-in. At Block 108 the terminal server 20 launches a guest OS instance, and the user log-in process begins at Block 110.

With respect to the layering service software, the layering service software hooks into the log-in process at Block 112. The layering service software captures a user ID a terminal server ID, and session ID of the Guest OS instance at Block 114. The layering service software accesses a policy database 62 at a policy server 60 at Block 116 to determine application layers based on the user ID, terminal server ID and stored rules. The policy server 60 returns a list of layers accessible to the user at Block 118.

The layering service software mounts the application layers that are needed and which have not already been previously mounted at Block 120. The layering service software stores a list of the application layers for the specific user session at Block 122. At Block 124, the layering service software starts any needed services and/or drivers for the mounted application layers to be added, and runs any programs requiring execution. The log-in process is completed at Block 126. The user now has a user-specific images layer that includes the OS layer and any base application layers plus the elastic layers that are specific to the user.

Within the flowchart 100, Steps 130-138 describe how the layering software service and the kernel drivers work together to allow the user to later access the user-specific image layer. At step 130, the user makes file, registry or other computing actions. The layering software kernel drivers intercept filesystem or registry actions at Block 132, and determines appropriate layers based on a stored layer list for the specific session at Block 134. The layering software kernel drivers generates a composite virtual namespace based on mounted layers accessible for the specific session at Block 136, and returns action results based on composited namespace at Block 138.

Figure 3:
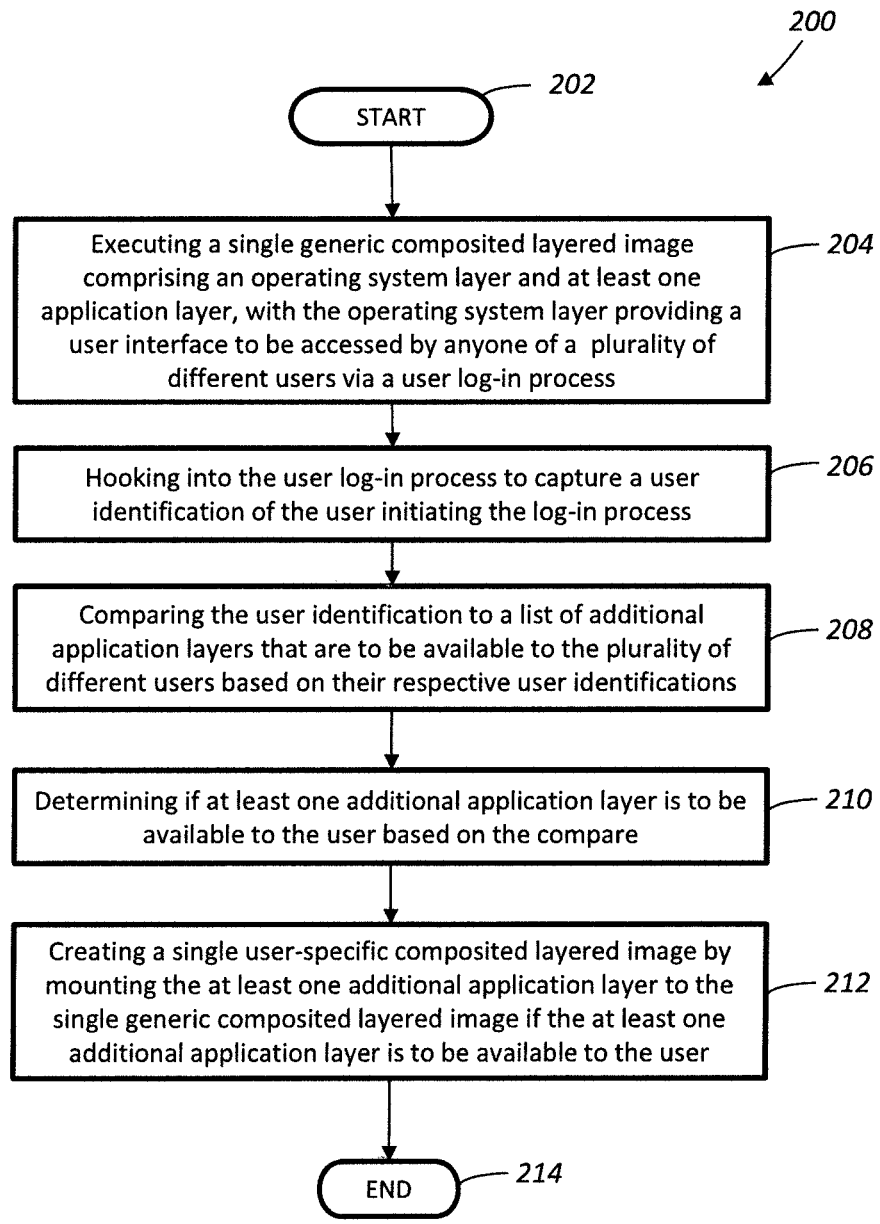
FIG. 3 is a flowchart showing a method for operating the server illustrated in FIG. 1

Referring now to FIG. 3, a flowchart 200 showing a method for operating the above described server will be discussed. From the start 202, the method includes executing a single generic composited layered image comprising an operating system layer 24 and at least one application layer 26 at Block 204. The operating system layer 24 provides a user interface to be accessed by anyone of a plurality of different users via a user log-in process. At Block 206, the method includes hooking into a user log-in process to capture a user identification of the user initiating the log-in process, and comparing the user identification to a list of additional application layers 40, 42 that are to be available to the plurality of different users based on their respective user identifications at Block 208. The method further includes determining at Block 210 if at least one additional application layer 40, 42 is to be available to the user based on the comparing, and at Block 212 creating a single user-specific composited layered image by mounting the at least one additional application layer 40, 42 to the single generic composited layered image if the at least one additional application layer 40, 42 is to be available to the user. The meth ends at Block 214.

Yet another aspect is directed to a non-transitory computer readable medium for a server 20 as described above, with the non-transitory computer readable medium having a plurality of computer executable instructions for causing the server 20 to perform steps comprising executing a single generic composited layered image comprising an operating system layer 24 and at least one application layer 26, with the operating system layer 24 providing a user interface to be accessed by anyone of a plurality of different users via a user log-in process. The steps further include hooking into a user log-in process to capture a user identification of the user initiating the log-in process, and comparing the user identification to a list of additional application layers 40, 42 that are to be available to the plurality of different users based on their respective user identifications. The steps further include determining if at least one additional application layer 40, 42 is to be available to the user based on the comparing, and creating a single user-specific composited layered image by mounting the at least one additional application layer 40, 42 to the single generic composited layered image if the at least one additional application layer is to be available to the user.

It is to be understood that the above description is intended to be illustrative, and not restrictive. Many other embodiments will be apparent to those of skill in the art upon reviewing the above description. The scope should, therefore, be determined with reference to the appended claims, along with the full scope of equivalents to which such claims are entitled.

That which is claimed is:

1. A server comprising:
a memory and at least one processor cooperating with said memory to execute a single generic composited layered image comprising an operating system layer and at least one application layer, with the operating system layer providing a user interface to be accessed by anyone of a plurality of different users via a user log-in process; and
a layering engine configured to perform, in response to each user log-in process, the following:
hook into the user log-in process to capture a user identification of the user initiating the log-in process,
compare, in response to the user log-in process, the user identification to a list of additional application layers that are to be selectively available to the plurality of different users based on their respective user identifications,
determine if at least one additional application layer is to be selectively available to the user based on the compare but not available to all of the other different users, and
create, in response to the determining, a single user-specific composited layered image by mounting the at least one additional application layer to the single generic composited layered image if the at least one additional application layer is to be selectively available to the user.

2. The server according to claim 1 wherein said layering engine is further configured to save the single user-specific composited layered image.

3. The server according to claim 2 wherein said layering engine is further configured to capture a host session identification based on the user logging-in so that a next time the user logs-in the single user-specific composited layered image is available.

4. The server according to claim 1 wherein said layering engine is further configured to access a policy database prior to the compare, with the policy database including the list of additional application layers that are to be available to the plurality of different users based on their respective user identifications.

5. The server according to claim 4 wherein the policy database is remotely located from the server.

6. The server according to claim 4 wherein the server has a host server identification associated therewith, and wherein the policy database further includes a list of host server identifications, with each host server identification identifying the list of additional application layers that are available to that host server, and wherein said layering engine is configured to further accesses the policy database based on the host server identification.

7. A method for operating a server comprising:
executing a single generic composited layered image comprising an operating system layer and at least one application layer, with the operating system layer providing a user interface to be accessed by anyone of a plurality of different users via a user log-in process;
hooking into a user log-in process to capture a user identification of the user initiating the log-in process;
comparing, in response to the user log-in process, the user identification to a list of additional application layers that are to be selectively available to the plurality of different users based on their respective user identifications;
determining if at least one additional application layer is to be selectively available to the user based on the comparing but not available to all of the other different users; and
creating, in response to the determining, a single user-specific composited layered image by mounting the at least one additional application layer to the single generic composited layered image if the at least one additional application layer is to be selectively available to the user.

8. The method according to claim 7 further comprising operating the layering engine to save the single user-specific composited layered image.

9. The method according to claim 8 further comprising operating the layering engine to capture a host session identification based on the user logging-in so that a next time the user logs-in the single user-specific composited layered image is available.

10. The method according to claim 7 further comprising operating the layering engine to access a policy database prior to the compare, with the policy database including the list of additional application layers that are to be available to the plurality of different users based on their respective user identifications.

11. The method according to claim 10 wherein the policy database is remotely located from the server.

12. The method according to claim 10 wherein the server has a host server identification associated therewith, and wherein the policy database further includes a list of host server identifications, with each host server identification identifying the list of additional application layers that are available to that host server, and wherein said layering engine is configured to further accesses the policy database based on the host server identification.

13. A non-transitory computer readable medium for a server, with the non-transitory computer readable medium having a plurality of computer executable instructions for causing the server to perform steps comprising:

executing a single generic composited layered image comprising an operating system layer and at least one application layer, with the operating system layer providing a user interface to be accessed by anyone of a plurality of different users via a user log-in process;

hooking into a user log-in process to capture a user identification of the user initiating the log-in process;

comparing, in response to the user log-in process, the user identification to a list of additional application layers that are to be selectively available to the plurality of different users based on their respective user identifications;

determining if at least one additional application layer is to be selectively available to the user based on the comparing but not available to all of the other different users; and creating, in response to the user determining, a single user-specific composited layered image by mounting the at least one additional application layer to the single generic composited layered image if the at least one additional application layer is to be selectively available to the user.

14. The non-transitory computer readable medium according to claim 13 further comprising operating the layering engine to save the single user-specific composited layered image.

15. The non-transitory computer readable medium according to claim 14 further comprising operating the layering engine to capture a host session identification based on the user logging-in so that a next time the user logs-in the single user-specific composited layered image is available.

16. The non-transitory computer readable medium according to claim 13 further comprising operating the layering engine to access a policy database prior to the compare, with the policy database including the list of additional application layers that are to be available to the plurality of different users based on their respective user identifications.

17. The non-transitory computer readable medium according to claim 16 wherein the policy database is remotely located from the server.

18. The non-transitory computer readable medium according to claim 16 wherein the server has a host server identification associated therewith, and wherein the policy database further includes a list of host server identifications, with each host server identification identifying the list of additional application layers that are available to that host server, and wherein said layering engine is configured to further accesses the policy database based on the host server identification.

* * * * *